United States Patent
Chen et al.

(10) Patent No.: US 12,003,275 B2
(45) Date of Patent: Jun. 4, 2024

(54) CLOCK SYNCHRONIZATION APPARATUS, OPTICAL TRANSMITTER, OPTICAL RECEIVER, AND CLOCK SYNCHRONIZATION METHOD

(71) Applicant: Huawei Technologies Co., Ltd., Shenzhen (CN)

(72) Inventors: Jun Chen, Chengdu (CN); Zhuhong Zhang, Ottawa (CA); Chuandong Li, Ottawa (CA); Jin Wan, Shenzhen (CN); Zhikui Yong, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 199 days.

(21) Appl. No.: 17/645,198

(22) Filed: Dec. 20, 2021

(65) Prior Publication Data

US 2022/0116115 A1 Apr. 14, 2022

Related U.S. Application Data

(63) Continuation of application No. PCT/CN2020/096422, filed on Jun. 16, 2020.

(30) Foreign Application Priority Data

Jun. 21, 2019 (CN) .......................... 201910544039.2

(51) Int. Cl.
 *H04B 10/00* (2013.01)
 *H04B 10/40* (2013.01)
 *H04L 7/00* (2006.01)

(52) U.S. Cl.
 CPC ........... *H04B 10/40* (2013.01); *H04L 7/0025* (2013.01); *H04L 7/0075* (2013.01)

(58) Field of Classification Search
 CPC ................ H04B 10/40; H04B 10/2507; H04B 10/0795; H04B 10/6165; H04B 10/60; H04B 10/6161; H04B 10/616; H04B 10/07955; H04B 10/07953; H04L 7/0075; H04L 7/0025; H04L 7/0331
 USPC ....... 398/154, 155, 135, 136, 137, 138, 139, 398/158, 159, 202, 208, 209, 183, 192, 398/193, 194, 195, 196, 33, 38, 25; 375/376, 354, 355, 316
 See application file for complete search history.

(56) References Cited

U.S. PATENT DOCUMENTS

| | | | |
|---|---|---|---|
| 9,094,132 B1 | 7/2015 | Thesling | |
| 9,337,934 B1 | 5/2016 | Agazzi et al. | |
| 11,212,070 B2 * | 12/2021 | Wan | H04B 10/2569 |
| 2002/0105448 A1 | 8/2002 | Freidhof | |
| 2003/0030872 A1 | 2/2003 | Jong et al. | |
| 2007/0092040 A1 | 4/2007 | Higashino | |

(Continued)

FOREIGN PATENT DOCUMENTS

| | | |
|---|---|---|
| CN | 101257482 A | 9/2008 |
| CN | 101841327 A | 9/2010 |
| CN | 102064900 A | 5/2011 |

(Continued)

*Primary Examiner* — Hanh Phan
(74) *Attorney, Agent, or Firm* — Slater Matsil, LLP

(57) ABSTRACT

A clock synchronization apparatus, an optical transmitter, an optical receiver, and a clock synchronization method are provided. In the clock synchronization apparatus, a digital interpolator adjusts a sampling clock frequency of a digital signal under sampling clock control of a clock control circuit.

19 Claims, 8 Drawing Sheets

(56) References Cited

U.S. PATENT DOCUMENTS

2015/0280857 A1\* 10/2015 Bianciotto ........... H04B 10/614
                                                        398/65

FOREIGN PATENT DOCUMENTS

| CN | 102412806  | A  | 4/2012  |
|----|------------|----|---------|
| CN | 104170286  | A  | 11/2014 |
| CN | 107841327  | A  | 3/2018  |
| CN | 108886406  | A  | 11/2018 |
| WO | 9837656    | A2 | 8/1998  |
| WO | 2016106548 | A1 | 7/2016  |
| WO | 2016209290 | A1 | 12/2016 |

\* cited by examiner

CLOCK SYNCHRONIZATION APPARATUS, OPTICAL TRANSMITTER, OPTICAL RECEIVER, AND CLOCK SYNCHRONIZATION METHOD

CROSS-REFERENCE TO RELATED APPLICATIONS

This application is a continuation of International Patent Application No. PCT/CN2020/096422, filed on Jun. 16, 2020, which claims priority to Chinese Patent Application No. 201910544039.2, filed on Jun. 21, 2019. The disclosures of the aforementioned applications are hereby incorporated by reference in their entireties.

TECHNICAL FIELD

This application relates to the field of optical communications technologies, and in particular, to a clock synchronization apparatus, an optical transmitter, an optical receiver, and a clock synchronization method.

BACKGROUND

To meet rapid development of the 5th generation (5G), a cloud service, and a high-definition video service, differentiation of optical transmission capacities and scenarios is accelerated while an optical fiber transmission bandwidth is expanded. For different scenarios, due to different optical transmission capacities and transmission distances, channel intervals with different bandwidths, such as 37.5 G/50 G/62.5 G/75 G/87.5 G/100 G, may be used. When processing a signal, an optical digital signal processor (ODSP) supports only processing a service with a fixed transmission rate by using a fixed sampling frequency, and therefore cannot be flexibly applied to different scenarios.

SUMMARY

This application provides a clock synchronization apparatus, an optical transmitter, an optical receiver, and a clock synchronization method, to implement flexible application to different application scenarios.

According to a first aspect, an embodiment of this application provides a clock synchronization apparatus. The clock synchronization apparatus is applied to an optical transmitter, and includes a digital interpolator, a digital delay element, and a clock control circuit. The digital interpolator is configured to perform sampling clock adjustment on a received first digital signal under phase control of the clock control circuit, to obtain a second digital signal; in other words, adjust a sampling clock of the received first digital signal under phase control of the clock control circuit, to obtain the second digital signal. The digital delay element is configured to delay the second optical digital signal to obtain a third optical digital signal. The clock control circuit is configured to: detect sampling clocks of the second optical digital signal and the third optical digital signal to obtain a sampling clock deviation, generate a clock control signal based on the sampling clock deviation, and perform sampling clock control on the digital interpolator based on the clock control signal.

The provided clock synchronization apparatus adaptively tracks and adjusts a sampling clock frequency without relying on a sampling frequency of a peripheral clock circuit, to ensure clock synchronization, thereby supporting flexible application to application scenarios with different bandwidth requirements.

In a possible design, the clock control circuit may include: a phase detector, configured to detect the second optical digital signal and the third optical digital signal to obtain the sampling clock deviation; and a loop controller, configured to generate the clock control signal based on the sampling clock deviation. This provides a simple and easy-to-implement structure of the clock control circuit.

For example, the digital delay element may be a first in first out delay memory, a ping-pong buffer, or a random access memory.

According to a second aspect, an embodiment of this application further provides an optical transmitter, including the clock synchronization apparatus provided in any one of the first aspect or designs of the first aspect. The optical transmitter further includes: a digital sampler, configured to perform time-domain upsampling on a third optical digital signal obtained by a digital delay element in the clock synchronization apparatus through delaying, to obtain a fourth digital signal; a phase-locked loop, configured to generate a clock signal with a fixed sampling frequency, where a sampling frequency of the fourth optical digital signal is the fixed sampling frequency; and a digital-to-analog converter, configured to convert the fourth digital signal into an analog signal based on the clock signal.

For beneficial effects of the second aspect, refer to the description of the first aspect. Details are not described herein again.

According to a third aspect, based on the same invention concept as the first aspect, an embodiment of this application further provides a clock synchronization method. The method is applied to a transmit end, and includes: performing sampling clock adjustment on a received first digital signal under control of a clock control signal by using a digital interpolator, to obtain a second digital signal; delaying the second optical digital signal to obtain a third optical digital signal; and detecting sampling clocks of the second optical digital signal and the third optical digital signal to obtain a sampling clock deviation, and generating, based on the sampling clock deviation, the clock control signal for controlling the digital interpolator. For specific beneficial effects, refer to the description of the first aspect. Details are not described herein again.

According to a fourth aspect, an embodiment of this application further provides a clock synchronization apparatus. The clock synchronization apparatus is applied to an optical receiver, and includes a digital interpolator and a clock control circuit. The digital interpolator is configured to perform sampling clock adjustment on a received fifth digital signal under sampling clock control of the clock control circuit, to obtain a sixth digital signal. The clock control circuit is configured to: generate a timing recovery control signal based on the sixth digital signal, and perform sampling clock control on the digital interpolator based on the timing recovery control clock signal. The provided clock synchronization apparatus is applied to the optical receiver, so that the clock synchronization apparatus adaptively tracks and adjusts a sampling clock frequency without relying on a sampling frequency of a peripheral clock circuit, to ensure clock synchronization, thereby supporting flexible application to application scenarios with different bandwidth requirements.

In a possible design, the clock control circuit may include: a timing recovery circuit, configured to obtain a timing recovery clock signal based on the sixth digital signal; and a loop controller, configured to generate the timing recovery control signal based on the timing recovery clock signal. This provides a simple and easy-to-implement structure of the clock control circuit.

According to a fifth aspect, an embodiment of this application further provides an optical receiver. The receiver includes the clock synchronization apparatus provided in any one of the fourth aspect or designs of the fourth aspect. The optical receiver further includes: a phase-locked loop, configured to generate a clock signal with a fixed sampling frequency; an analog-to-digital converter, configured to convert a received analog signal into a seventh digital signal based on the clock signal; and a digital sampler, configured to perform time-domain downsampling on the seventh digital signal to obtain a fifth digital signal. For specific beneficial effects, refer to the description of the fourth aspect. Details are not described herein again.

According to a sixth aspect, based on the same invention concept as the fourth aspect, an embodiment of this application further provides a clock synchronization method. The method is applied to an optical receiver, and includes: performing sampling clock adjustment on a received fifth digital signal under control of a timing recovery control signal by using a digital interpolator, to obtain a sixth digital signal; and generating, based on the sixth digital signal, the timing recovery control signal for controlling the digital interpolator. For specific beneficial effects, refer to the description of the fourth aspect. Details are not described herein again.

According to a seventh aspect, an embodiment of this application further provides an optical transceiver apparatus, including the optical transmitter according to the second aspect and the optical receiver according to the fifth aspect.

DETAILED DESCRIPTION OF ILLUSTRATIVE EMBODIMENTS

Figure 1:
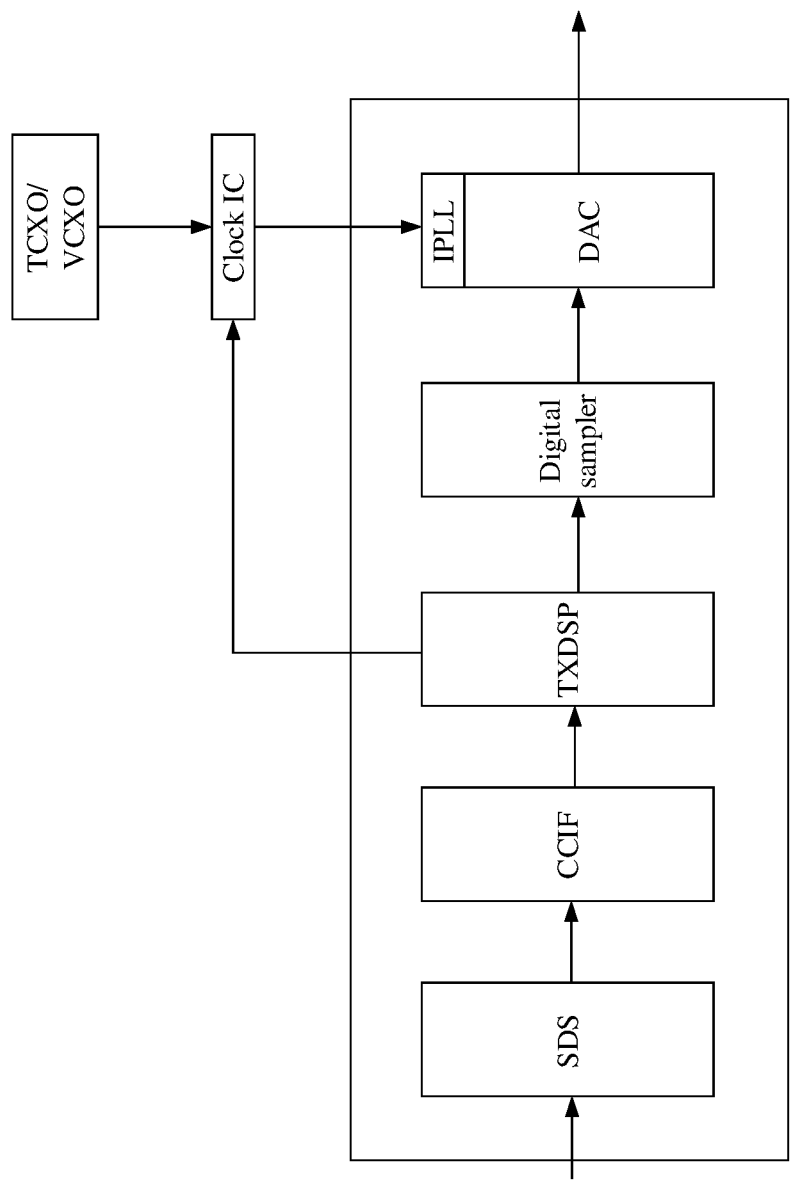
FIG. 1 is a schematic structural diagram of an optical transmitter applied to a fixed-bandwidth scenario according to an embodiment of this application.

It should be understood that "an embodiment", "an implementation", or "an example" mentioned in the whole specification means that particular features, structures, or characteristics related to the embodiment are included in at least one embodiment of this application. Therefore, "in an embodiment", "in an implementation", or "in an example" appearing throughout the specification does not necessarily indicate a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. In this application, the term "at least one" includes one, two, three, or more, and the term "a plurality of" includes two, three, or more. The term "at least one of the following items" or a similar expression means any combination of these items, including any combination of singular items or plural items. For example, at least one of a, b, or c may indicate a, b, c, a-b, a-c, b-c, or a-b-c, where a, b, and c may be singular or plural. It should be understood that in the embodiments of this application, "B corresponding to A" indicates that B is associated with A and B may be determined based on A. However, it should be further understood that determining B based on A does not mean that B is determined based on A only; in other words, B may be alternatively determined based on A and/or other information. In addition, unless otherwise stated, ordinal numbers such as "first" and "second" in the embodiments of this application are intended to distinguish between a plurality of objects, and not intended to limit an order, a time sequence, priorities, or importance of the plurality of objects. In addition, the terms "include (comprise)" and "have" in the embodiments and claims of this application and the accompanying drawings are not exclusive. For example, a process, a method, a system, a product, or a device including a series of steps or modules is not limited to the listed steps or modules, and may further include steps or modules that are not listed.

The embodiments of this application are applicable to a scenario supporting a flexible service rate, such as a 5G scenario, a cloud service scenario, or a high-definition video transmission scenario. For different application scenarios, due to different optical transmission capacities and transmission distances, different channel intervals, such as 37.5 G/50 G/62.5 G/75 G/87.5 G/100 G, may be used. Different channel intervals correspond to different transmission service bandwidths. Therefore, an ODSP needs to forward service data with different bandwidths, and a transmitter (TX)/receiver (RX) includes a digital-to-analog converter (DAC)/analog-to-digital converter (ADC) that supports an ultra-high sampling frequency. If sampling performance of the DAC/ADC (for example, a quantity of significant bits, or referred to as a significant bit quantity) needs to be ensured, it cannot be ensured that a sampling clock frequency range of the DAC/ADC flexibly covers a plurality of scenarios.

Due to a limitation of the sampling clock frequency range of the DAC/ADC, the ODSP cannot forward service data with different bandwidths.

Based on this, the embodiments of this application provide a clock synchronization solution, so that the ODSP can forward service data with different bandwidths.

Before the clock synchronization solution provided in this application is described, a structure and a used clock synchronization solution of an ODSP applicable to a fixed-transmission-bandwidth scenario are first described.

FIG. 1 is a schematic structural diagram of a TX in the ODSP.

The transmitter may include a serializer/deserializer (SERDES or SDS), an interface circuit (chip-chip interface), a TXDSP, a digital sampler, a digital-to-analog converter (DAC), and an integer phase-locked loop (IPLL). In addition, an oscillator and a clock integrated circuit (IC) may be further disposed outside the ODSP. The clock IC may also be referred to as a clock microcircuit, a clock microchip, or a clock chip. The crystal oscillator may be, for example, a temperature compensated crystal oscillator (TCXO) or a voltage-controlled crystal oscillator (VCXO).

The SDS is mainly configured to convert received serial data into parallel data, or convert received parallel data into serial data. It should be understood that, serial-to-parallel conversion may improve a data processing speed, and parallel-to-serial conversion may recover initial data. The SDS in the transmitter is configured to: convert received one channel of serially transmitted service data into a plurality of channels of service data, and then transmit the plurality of channels of service data to the TXDSP by using the CCIF between the SDS and the TXDSP. After receiving the plurality of channels of service data, the TXDSP performs digital signal processing, such as digital-domain upsampling, frequency-domain pre-compensation, or frame multiplexing, on the plurality of channels of service data. All the channels of service data are processed in a same manner. The following uses one channel of service data as an example. The TXDSP feeds back a transmission rate of the channel of service data to the clock IC, and sends a digital signal obtained after digital signal processing to the digital sampler for time-domain upsampling processing. Then, the digital sampler sends a digital signal obtained after the time-domain upsampling processing to the DAC for digital-to-analog conversion processing, to convert the digital signal obtained after the time-domain upsampling processing into an analog signal.

The TCXO/VCXO is configured to: generate a clock signal with a reference clock frequency, and input the clock signal with the reference clock frequency to the clock IC. The clock IC performs frequency multiplication processing on the reference clock frequency based on the transmission rate of the service data, to obtain a clock signal with a sampling frequency that matches the transmission rate of the service data. The IPLL in the transmitter performs frequency multiplication processing on the clock signal with the sampling frequency that matches the transmission rate of the service data, to obtain a sampling clock signal needed by the DAC. Then, when converting the digital signal obtained after the time-domain upsampling processing into the analog signal, the DAC converts the digital signal obtained after the time-domain upsampling processing into the analog signal based on the sampling clock signal obtained by the IPLL after the frequency multiplication processing.

Figure 2:
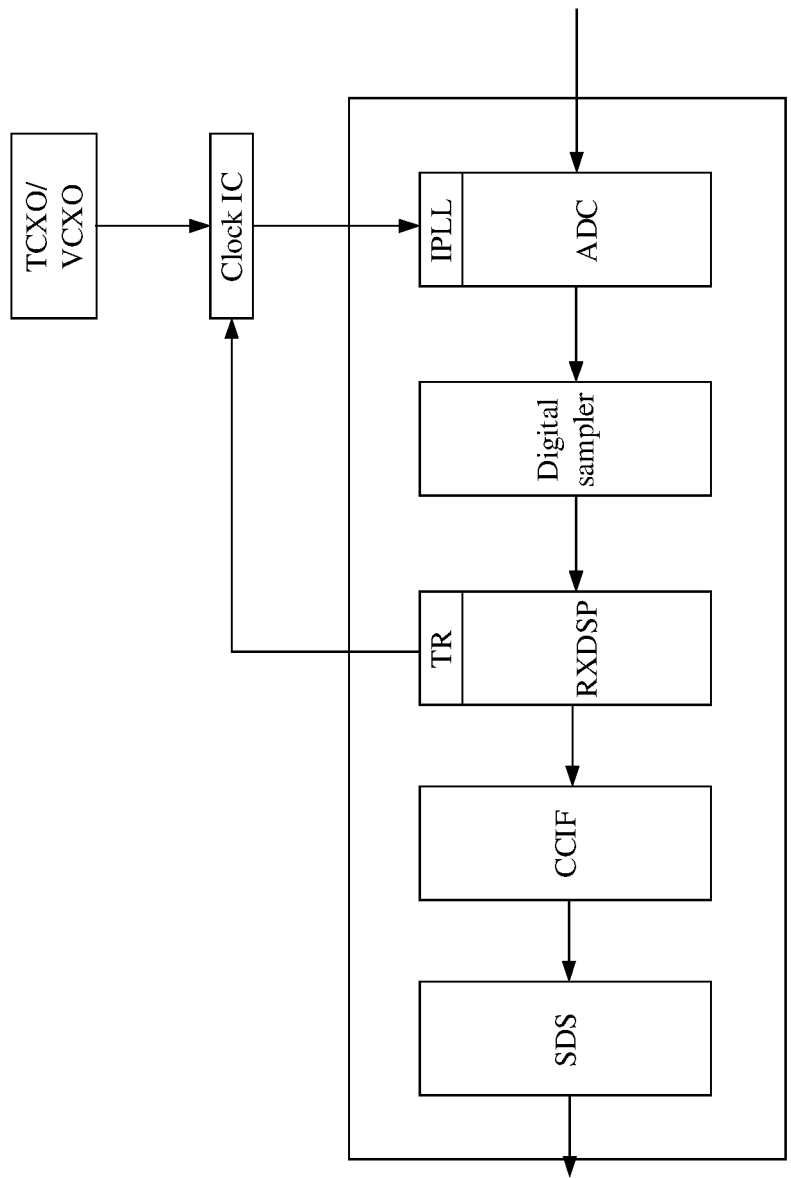
FIG. 2 is a schematic structural diagram of an optical receiver applied to a fixed-bandwidth scenario according to an embodiment of this application.

FIG. 2 is a schematic structural diagram of an RX in the ODSP.

The receiver may include an SDS, an interface circuit (chip-chip interface), an RXDSP, a digital sampler (such as a digital downsampler TDDS), a timing recovery (TR) circuit, an analog-to-digital converter (ADC), and an IPLL. In addition, an oscillator and a clock IC may be further disposed outside the ODSP. The oscillator is, for example, a temperature compensated crystal oscillator (TCXO) or a voltage-controlled crystal oscillator (VCXO).

The ADC converts a received analog signal into a digital signal. Then, the TDDS performs time-domain downsampling on the digital signal obtained by the ADC after the conversion. Then, the RXDSP performs digital signal processing on a digital signal obtained after the time-domain downsampling, to obtain a plurality of channels of service data, and then transmits the plurality of channels of service data to the SDS by using the CCIF. The SDS recovers the plurality of channels of service data to one channel of service data.

The TR obtains a sampling frequency (or a sampling rate) of the service data based on a service clock signal used for the service data obtained by the RXDSP after the digital signal processing, and then feeds back the service clock signal to the clock IC. The receiver performs, by using the clock IC, frequency multiplication processing on a reference clock frequency provided by the oscillator, to obtain the service clock signal, and then fixes, by using the IPLL, a sampling rate of the ADC at a sampling clock (namely, the service clock signal) needed by the service data.

It may be learned from the foregoing that, in FIG. 1 and FIG. 2, the IPLL generates the sampling clock signal for the ADC based on the sampling frequency of the service data. At present, the IPLL can provide only a sampling clock signal with a sampling frequency of the ADC/DAC within a limited range. Therefore, it cannot be ensured that a sampling clock frequency range of the DAC/ADC flexibly covers a plurality of scenarios.

An embodiment of this application provides a clock synchronization architecture in a FreeRun mode. In this FreeRun mode, clock synchronization is implemented without relying on a sampling frequency of a peripheral clock circuit. Instead, clock synchronization is ensured by using a clock sampling frequency adaptively tracked and adjusted by an ODSP.

Figure 3:
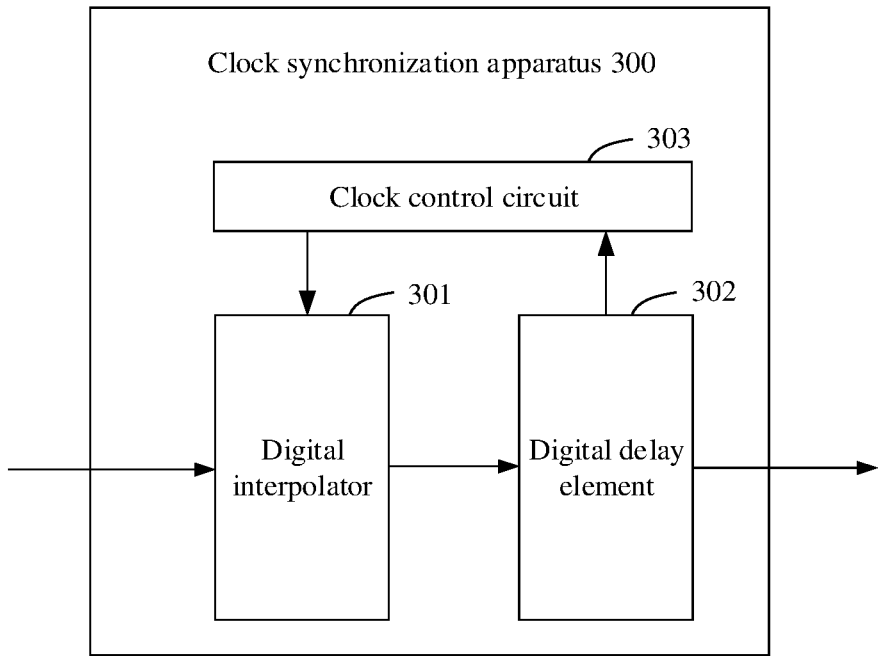
FIG. 3 is a schematic diagram of a clock synchronization apparatus applied to an optical transmitter according to an embodiment of this application.

FIG. 3 shows a clock synchronization apparatus 300 applicable to an optical transmitter. The clock synchronization apparatus 300 may include a digital interpolator 301, a digital delay element 302, and a clock control circuit 303.

The digital interpolator 301 is configured to perform sampling clock adjustment on a received first digital signal under phase control of the clock control circuit 303, to obtain a second digital signal.

During specific implementation, the digital interpolator 301 may adjust a sampling clock of the first digital signal in frequency domain or time domain. In an example, the function of the digital interpolator 301 may be implemented by a time-domain finite impulse response (FIR) filter. Specifically, the FIR performs sampling clock adjustment on the first digital signal in time domain. In another example, the function of the digital interpolator 301 may be alternatively implemented by a frequency-domain delay multiplier. Specifically, the frequency-domain delay multiplier performs sampling clock adjustment on the first digital signal in frequency domain.

The digital delay element 302 is configured to delay the second optical digital signal to obtain a third optical digital signal. For example, the digital delay element 302 may be a first in first out (FIFO) delay memory, a ping-pong buffer, or a random access memory (RAM). The digital delay element 302 may be alternatively another circuit structure that can implement a delay function. A specific structure of the digital delay element 302 is not specifically limited in this embodiment of this application.

The clock control circuit 303 is configured to: detect sampling clocks of the second optical digital signal and the third optical digital signal to obtain a sampling clock deviation, generate a clock control signal based on the sampling clock deviation, and perform sampling clock control on the digital interpolator 301 based on the clock control signal.

Figure 4:
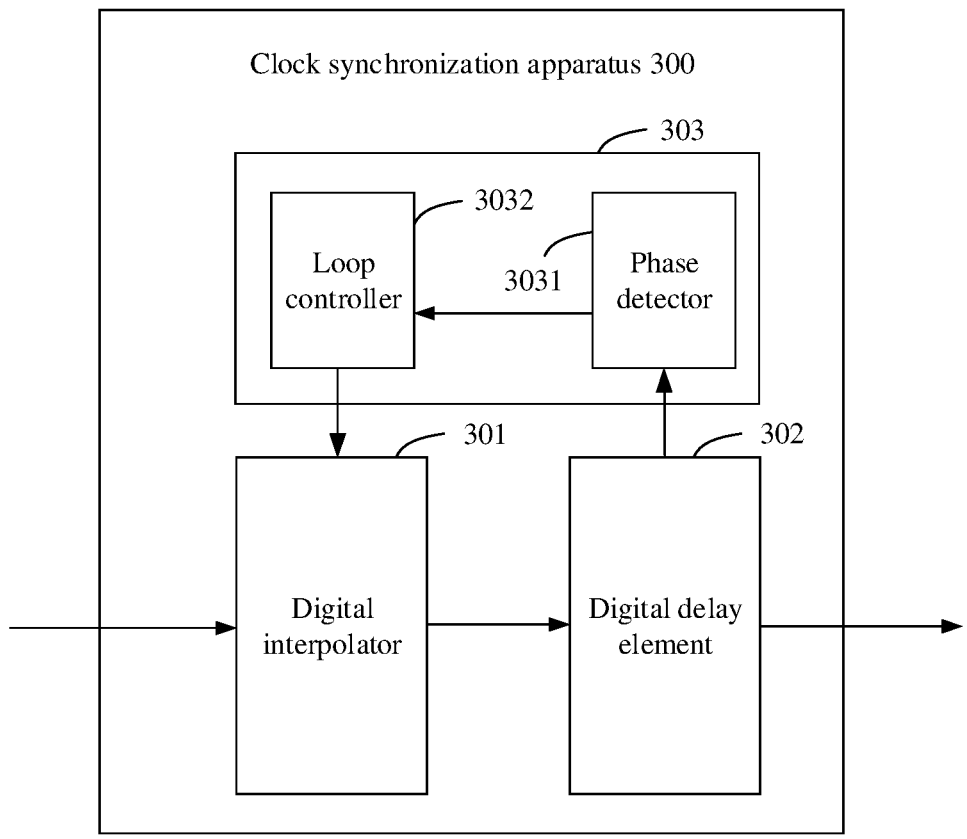
FIG. 4 is a schematic diagram of another clock synchronization apparatus applied to an optical transmitter according to an embodiment of this application.

For example, for a possible structure of the clock control circuit 303, refer to FIG. 4. In this example, the clock control circuit 303 includes a phase detector (PD) 3031 and a loop controller 3032. The PD 3031 is configured to detect the second optical digital signal and the third optical digital signal to obtain the sampling clock deviation. For example, the sampling clock deviation may be a phase deviation or a sampling frequency deviation. The loop controller 3032 is configured to generate the clock control signal based on the sampling clock deviation.

The second digital signal is used as input of the digital delay element 302, and is related to a bandwidth of flexible-rate service data obtained by the optical transmitter. The third digital signal is used as output of the digital delay element 302, and is related to a bandwidth of a signal transmitted by the optical transmitter. The PD 3031 detects bandwidths of the input signal and the output signal of the digital delay element 302, to obtain a bandwidth deviation between the input signal and the output signal. In other words, the digital delay element 302 coarsely adjusts, based on the bandwidths of the input signal and the output signal, a sampling rate of the service data received by the optical transmitter, and then the clock control circuit 303 and the digital interpolator 301 finely adjust a sampling rate obtained by the digital delay element 302 after the coarse adjustment.

It should be understood that a phase deviation may exist because a transmission bandwidth of the service data received by the optical transmitter is different from a transmission bandwidth of service data output by the optical transmitter. Therefore, the clock synchronization apparatus coarsely adjusts the sampling rate of the received service data; in other words, coarsely adjusts the phase deviation, by using the digital delay element 302, and then finely adjusts, by using the clock control circuit 303 and the digital interpolator 301, a phase deviation obtained after the coarse adjustment.

Figure 5:
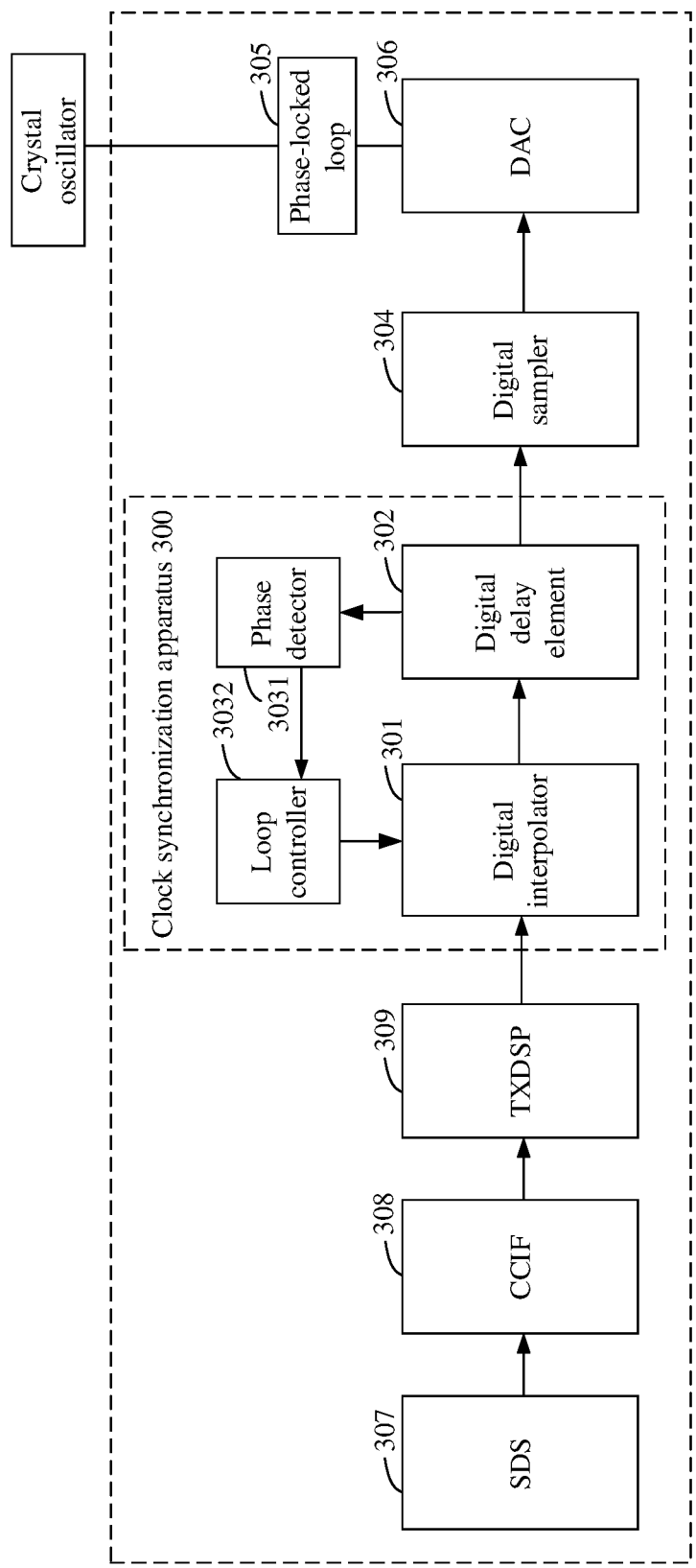
FIG. 5 is a schematic structural diagram of an optical transmitter applied to a flexible-bandwidth scenario according to an embodiment of this application.

FIG. 5 is a schematic structural diagram of an optical transmitter applicable to a flexible-bandwidth scenario. The optical transmitter may include the foregoing clock synchronization apparatus 300 shown in FIG. 3 or FIG. 4. In addition, the optical transmitter further includes a digital sampler 304, a phase-locked loop 305, and a DAC 306.

The digital sampler 304 is configured to perform time-domain upsampling on a third optical digital signal obtained by a digital delay element 302 in the clock synchronization apparatus 300 through delaying, to obtain a fourth digital signal. The phase-locked loop 305 is configured to generate a clock signal with a fixed sampling frequency based on an external clock source. A sampling frequency of the fourth optical digital signal is the fixed sampling frequency. The DAC 306 is configured to convert the fourth digital signal into an analog signal based on the clock signal.

For example, the phase-locked loop 305 may be an IPLL or a fraction phase-locked loop (FPLL).

For example, the optical transmitter may further include an SDS 307, a CCIF 308, and a TXDSP 309. For a specific function shown in FIG. 5, refer to the description in the embodiment in FIG. 1. Details are not described herein again. A sampling frequency of a service flow received by the optical transmitter may be synchronized with a sampling frequency of the DAC by using the clock synchronization apparatus 300. A crystal oscillator, such as a TCXO or a VCXO, may be further disposed outside the optical transmitter. The crystal oscillator is used as the external clock source, and the phase-locked loop 305 generates the clock signal with the fixed sampling frequency for the DAC based on the external clock source, so that the DAC performs the digital-to-analog conversion operation based on the clock signal with the fixed sampling frequency.

Figure 6:
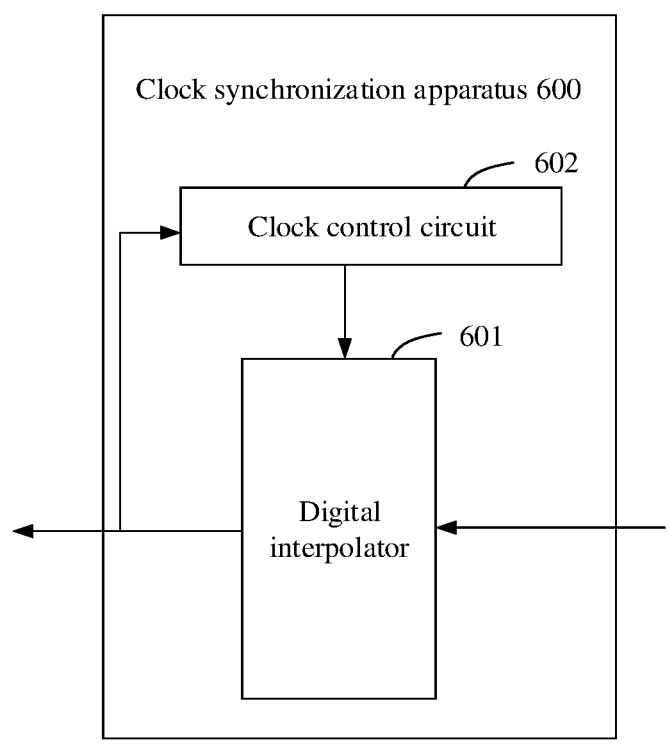
FIG. 6 is a schematic diagram of a clock synchronization apparatus applied to an optical receiver according to an embodiment of this application.

FIG. 6 shows a clock synchronization apparatus 600 applicable to an optical receiver. The clock synchronization apparatus 600 may include a digital interpolator 601 and a clock control circuit 602.

The digital interpolator 601 is configured to perform sampling clock adjustment on a received fifth digital signal under sampling clock control of the clock control circuit, to obtain a sixth digital signal.

During specific implementation, the digital interpolator 601 may adjust a sampling clock of the fifth digital signal in frequency domain or time domain. For example, the function of the digital interpolator 601 may be implemented by a time-domain FIR filter or a frequency-domain delay multiplier.

The clock control circuit 602 is configured to: generate a timing recovery control signal based on the sixth digital signal, and perform sampling clock control on the digital interpolator 601 based on the timing recovery control clock signal.

Figure 7:
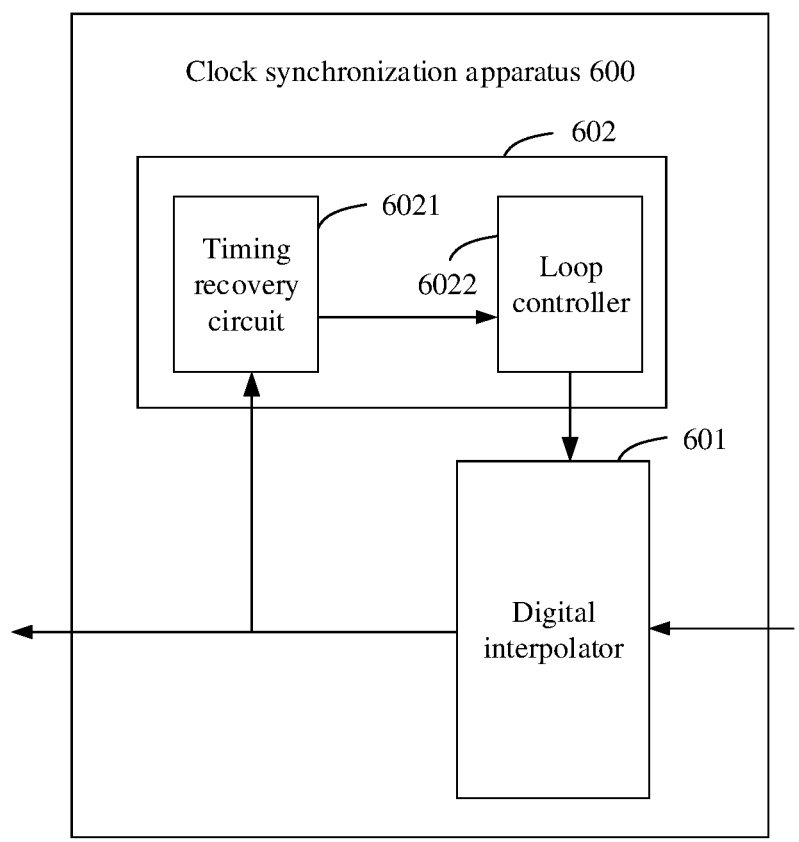
FIG. 7 is a schematic diagram of another clock synchronization apparatus applied to an optical receiver according to an embodiment of this application.

For example, for a possible structure of the clock control circuit 602, refer to FIG. 7. In this example, the clock control circuit 602 may include a timing recovery circuit 6021 and a loop controller 6022. The timing recovery circuit 6021 is configured to obtain a timing recovery clock signal based on the sixth digital signal. The loop controller 6022 is configured to generate the timing recovery control signal based on the timing recovery clock signal. During specific implementation, the timing recovery circuit 6021 extracts a timing offset based on the sixth digital signal, and generates the timing recovery clock signal based on the timing offset.

Figure 8:
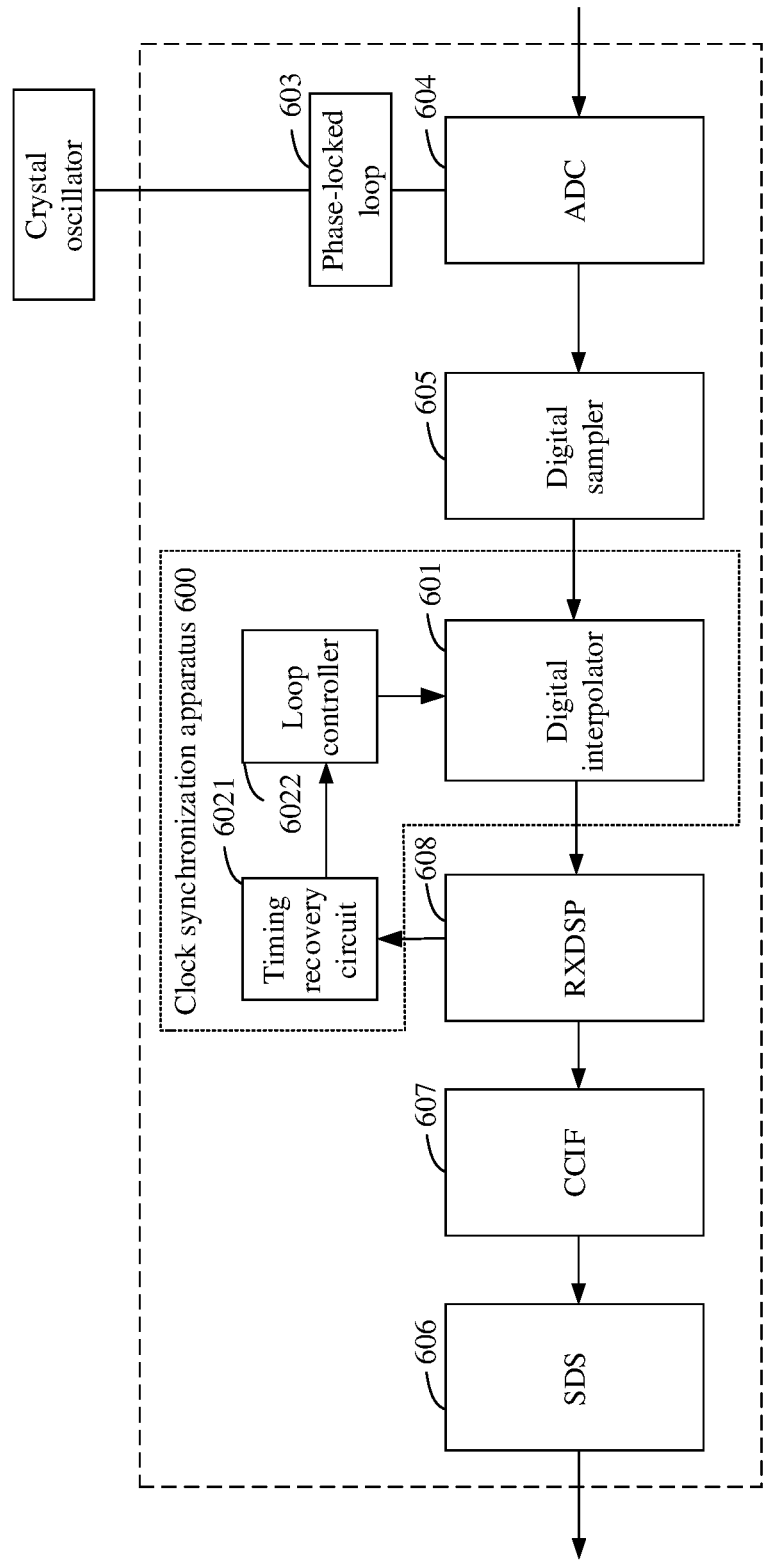
FIG. 8 is a schematic structural diagram of an optical receiver applied to a flexible-bandwidth scenario according to an embodiment of this application.

FIG. 8 is a schematic structural diagram of an optical receiver applicable to a flexible-bandwidth scenario. The optical receiver may include the foregoing clock synchronization apparatus 600 shown in FIG. 6 or FIG. 7. In addition, the optical receiver may further include a phase-locked loop 603, an ADC 604, and a digital sampler 605. For example, the phase-locked loop 603 may be an IPLL or an FPLL. The phase-locked loop 603 is configured to generate a clock signal with a fixed sampling frequency. The ADC 604 is configured to convert a received analog signal into a seventh digital signal based on the clock signal. The digital sampler 605 is configured to perform time-domain down-sampling on the seventh digital signal to obtain the fifth digital signal.

For example, the optical receiver may further include an SDS 606, a CCIF 607, and an RXDSP 608. For a specific function shown in FIG. 8, refer to the description in the embodiment in FIG. 2. Details are not described herein again. A sampling frequency of a service flow received by the optical receiver may be synchronized with a sampling frequency of the ADC by using the clock synchronization apparatus 600. A crystal oscillator, such as a TCXO or a VCXO, may be further disposed outside the optical receiver. The crystal oscillator is used as an external clock source, and the phase-locked loop 603 generates the clock signal with the fixed sampling frequency for the ADC based on the external clock source, so that the ADC performs the analog-to-digital conversion operation based on the clock signal with the fixed sampling frequency.

An embodiment of this application further provides an optical transceiver apparatus. The optical transceiver apparatus may include an optical transmitter and an optical receiver. The transceiver apparatus may be implemented by using a processor. For example, the processor in this embodiment of this application may be an application-specific integrated circuit (ASIC), a field-programmable gate array (FPGA), another programmable logic device, a discrete gate, a transistor logic device, and/or another device that can provide the foregoing function.

For example, refer to the optical transmitter shown in FIG. 5 and the optical receiver shown in FIG. 8. Details are not described herein again. It should be understood that FIG. 5 shows only some structures in the optical transmitter as an example. For example, the optical transmitter may further include an optical-electrical conversion apparatus, configured to perform optical-to-electrical conversion or electrical-to-optical conversion. FIG. 8 shows only some structures in the optical receiver as an example. For example, the optical receiver may further include an optical-electrical conversion apparatus.

According to the foregoing clock synchronization solution provided in the embodiments of this application, clock synchronization is ensured by using a clock frequency adaptively tracked and adjusted by the ODSP, and the clock signal with the fixed sampling frequency is used in the ADC/DAC. Therefore, performance of the ADC/DAC can be ensured. In addition, a peripheral clock circuit can be simplified, and further a requirement for a sampling clock frequency range of the ADC/DAC in scenarios with different service transmission bandwidths can be reduced.

Figure 9:
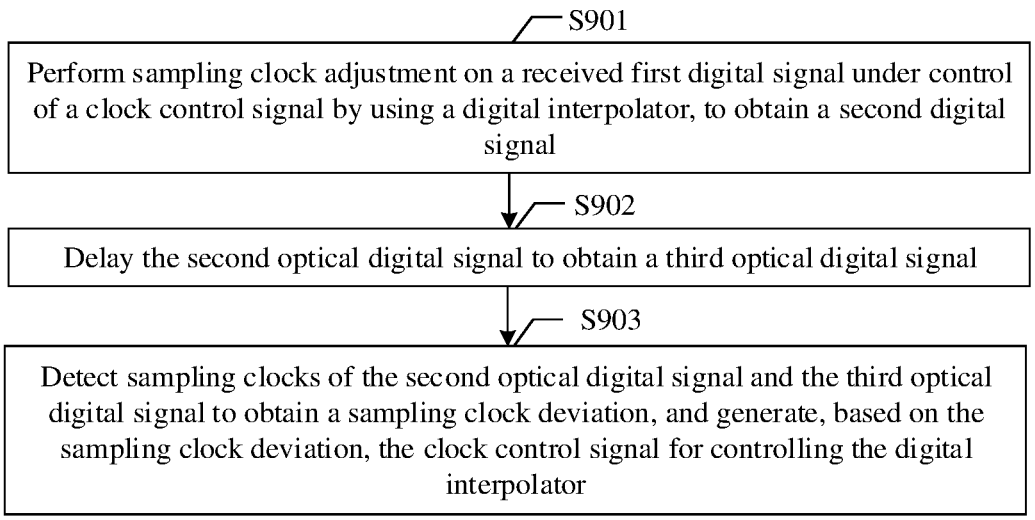
FIG. 9 is a schematic flowchart of a signal transmission method according to an embodiment of this application.

Based on the same invention concept as the foregoing, an embodiment of this application further provides a signal transmission method, applied to a transmit end, and shown in FIG. 9. The signal transmission method includes the following steps.

S901. Perform sampling clock adjustment on a received first digital signal under control of a clock control signal by using a digital interpolator, to obtain a second digital signal.

S902. Delay the second optical digital signal to obtain a third optical digital signal.

S903. Detect sampling clocks of the second optical digital signal and the third optical digital signal to obtain a sampling clock deviation, and generate, based on the sampling clock deviation, the clock control signal for controlling the digital interpolator.

In a possible implementation, after the delaying the second optical digital signal to obtain a third optical digital signal, the method may further include: performing time-domain upsampling on the third optical digital signal to obtain a fourth digital signal; and converting the fourth digital signal into an analog signal based on a clock signal with a fixed sampling frequency.

For example, the clock signal with the fixed sampling frequency may be generated by an IPLL based on an external clock source.

Figure 10:
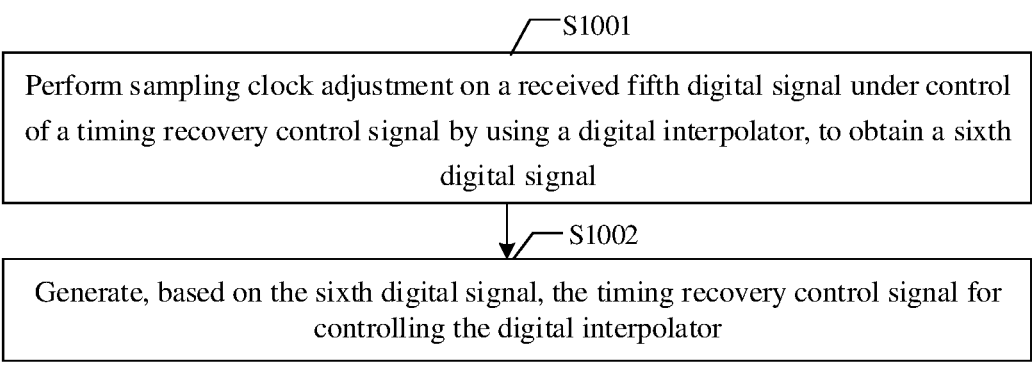
FIG. 10 is a schematic flowchart of a signal receiving method according to an embodiment of this application.

Based on the same invention concept as the foregoing, an embodiment of this application further provides a signal receiving method, applied to a receive end, and shown in FIG. 10. The signal receiving method includes the following steps.

S1001. Perform sampling clock adjustment on a received fifth digital signal under control of a timing recovery control signal by using a digital interpolator, to obtain a sixth digital signal.

S1002. Generate, based on the sixth digital signal, the timing recovery control signal for controlling the digital interpolator.

In a possible implementation, the method further includes: converting a received analog signal into a seventh digital signal based on a clock signal with a fixed sampling frequency, and then performing time-domain downsampling on the seventh digital signal to obtain the fifth digital signal.

It should be understood that the foregoing signal receiving method and transmission method may be implemented by using a processor applied to the receive end or the transmit end.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be alternatively stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be alternatively loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Clearly, a person skilled in the art can make various modifications and variations to this application without departing from the scope of this application. This application is intended to cover these modifications and variations of this application provided that they fall within the scope of the claims of this application and their equivalent technologies.

What is claimed is:

1. An optical transmitter, comprising:
a digital interpolator;
a digital delay element; and
a clock control circuit;
wherein the digital interpolator is configured to perform sampling clock adjustment on a received first digital signal under phase control of the clock control circuit, to obtain a second optical digital signal;
wherein the digital delay element is configured to delay the second optical digital signal, to obtain a third optical digital signal; and
wherein the clock control circuit is configured to:
detect sampling clocks of the second optical digital signal and the third optical digital signal, to obtain a sampling clock deviation;
generate a clock control signal based on the sampling clock deviation; and
perform sampling clock control on the digital interpolator based on the clock control signal.

2. The optical transmitter according to claim 1, wherein the clock control circuit comprises:
a phase detector, configured to detect the second optical digital signal and the third optical digital signal, to obtain the sampling clock deviation; and
a loop controller, configured to generate the clock control signal based on the sampling clock deviation.

3. The optical transmitter according to claim 2, wherein the digital delay element is a first in first out (FIFO) delay memory.

4. The optical transmitter according to claim 3, further comprising:
a digital sampler, configured to perform time-domain up-sampling on the third optical digital signal obtained by the digital delay element, to obtain a fourth optical digital signal;
a phase-locked loop, configured to generate a clock signal with a fixed sampling frequency, wherein a sampling frequency of the fourth optical digital signal is the fixed sampling frequency; and
a digital-to-analog converter, configured to convert the fourth optical digital signal into an analog signal based on the clock signal.

5. The optical transmitter according to claim 2, further comprising:
a digital sampler, configured to perform time-domain up-sampling on the third optical digital signal obtained by the digital delay element, to obtain a fourth optical digital signal;
a phase-locked loop, configured to generate a clock signal with a fixed sampling frequency, wherein a sampling frequency of the fourth optical digital signal is the fixed sampling frequency; and
a digital-to-analog converter, configured to convert the fourth optical digital signal into an analog signal based on the clock signal.

6. The optical transmitter according to claim 1, wherein the digital delay element is a first in first out (FIFO) delay memory.

7. The optical transmitter according to claim 6, further comprising:
a digital sampler, configured to perform time-domain up-sampling on the third optical digital signal obtained by the digital delay element, to obtain a fourth optical digital signal;
a phase-locked loop, configured to generate a clock signal with a fixed sampling frequency, wherein a sampling frequency of the fourth optical digital signal is the fixed sampling frequency; and
a digital-to-analog converter, configured to convert the fourth optical digital signal into an analog signal based on the clock signal.

8. The optical transmitter according to claim 1, further comprising:
a digital sampler, configured to perform time-domain upsampling on the third optical digital signal obtained by the digital delay element, to obtain a fourth optical digital signal;
a phase-locked loop, configured to generate a clock signal with a fixed sampling frequency, wherein a sampling frequency of the fourth optical digital signal is the fixed sampling frequency; and
a digital-to-analog converter, configured to convert the fourth optical digital signal into an analog signal based on the clock signal.

9. An optical receiver, comprising:
a phase-locked loop, configured to generate a clock signal with a fixed sampling frequency;
an analog-to-digital converter, configured to convert a received analog signal into a third digital signal based on the clock signal;
a digital sampler, configured to perform time-domain downsampling on the third digital signal, to obtain a first digital signal;
a clock control circuit; and
a digital interpolator, configured to perform sampling clock adjustment on the first digital signal under sampling clock control of the clock control circuit, to obtain a second digital signal; and
wherein the clock control circuit is configured to:
generate a timing recovery control signal based on the second digital signal; and
perform sampling clock control on the digital interpolator based on the timing recovery control signal.

10. The optical receiver according to claim 9, wherein the clock control circuit comprises:
a timing recovery circuit, configured to obtain a timing recovery clock signal based on the second digital signal; and
a loop controller, configured to generate the timing recovery control signal based on the timing recovery clock signal.

11. The optical receiver according to claim 9, wherein the digital interpolator comprises a time-domain finite impulse response (FIR) filter.

12. The optical receiver according to claim 9, wherein the digital interpolator comprises a frequency-domain delay multiplier.

13. The optical receiver according to claim 9, wherein the clock control circuit is configured to extract a timing offset based on the second digital signal, and generate a timing recovery clock signal based on the timing offset.

14. The optical receiver according to claim 9, wherein the phase-locked loop is an integer phase-locked loop (IPLL).

15. The optical receiver according to claim 9, wherein the phase-locked loop is a fraction phase-locked loop (FPLL).

16. An optical transceiver apparatus, comprising:
an optical transmitter; and
an optical receiver;
wherein the optical transmitter comprises a first digital interpolator, a digital delay element, and a first clock control circuit;
wherein the first digital interpolator is configured to perform sampling clock adjustment on a received first digital signal under phase control of the first clock control circuit, to obtain a second optical digital signal;
wherein the digital delay element is configured to delay the second optical digital signal, to obtain a third optical digital signal;
wherein the first clock control circuit is configured to:
detect sampling clocks of the second optical digital signal and the third optical digital signal, to obtain a sampling clock deviation;
generate a clock control signal based on the sampling clock deviation; and
perform sampling clock control on the first digital interpolator based on the clock control signal;
wherein the optical receiver comprises a second digital interpolator and a second clock control circuit;
wherein the second digital interpolator is configured to perform sampling clock adjustment on a received fifth digital signal under sampling clock control of the second clock control circuit, to obtain a sixth digital signal; and
wherein the second clock control circuit is configured to:
generate a timing recovery control signal based on the sixth digital signal; and
perform sampling clock control on the second digital interpolator based on the timing recovery control signal.

17. The optical transceiver apparatus according to claim 16, wherein the first clock control circuit comprises:
a phase detector, configured to detect the second optical digital signal and the third optical digital signal, to obtain the sampling clock deviation; and
a loop controller, configured to generate the clock control signal based on the sampling clock deviation.

18. The optical transceiver apparatus according to claim 16, wherein the optical transmitter further comprises:
a digital sampler, configured to perform time-domain upsampling on the third optical digital signal obtained by the digital delay element, to obtain a fourth optical digital signal;
a phase-locked loop, configured to generate a clock signal with a fixed sampling frequency, wherein a sampling frequency of the fourth optical digital signal is the fixed sampling frequency; and
a digital-to-analog converter, configured to convert the fourth optical digital signal into an analog signal based on the clock signal.

19. The optical transceiver apparatus according to claim 16, wherein the optical receiver further comprises:
a phase-locked loop, configured to generate a clock signal with a fixed sampling frequency;
an analog-to-digital converter, configured to convert a received analog signal into a seventh digital signal based on the clock signal; and
a digital sampler, configured to perform time-domain downsampling on the seventh digital signal to obtain the fifth digital signal.

* * * * *